US006747822B2

(12) United States Patent  (10) Patent No.: US 6,747,822 B2
Saito                       (45) Date of Patent:    Jun. 8, 2004

(54) METHOD OF MAGNETIC TRANSFER FOR PERPENDICULAR RECORDING MEDIUM

(75) Inventor: Akira Saito, Nagano (JP)

(73) Assignee: Fuji Electric Co., Ltd. (JP)

(*) Notice: Subject to any disclaimer, the term of this patent is extended or adjusted under 35 U.S.C. 154(b) by 272 days.

(21) Appl. No.: 09/886,943

(22) Filed: Jun. 22, 2001

(65) Prior Publication Data

US 2002/0034107 A1 Mar. 21, 2002

(30) Foreign Application Priority Data

Jun. 28, 2000 (JP) .................................. 2000-195345
Mar. 22, 2001 (JP) .................................. 2001-083194

(51) Int. Cl.⁷ ............................................. G11B 5/86
(52) U.S. Cl. ..................................... 360/17; 360/16
(58) Field of Search .......................... 360/55, 17, 16; 369/48; 428/694

(56) References Cited

U.S. PATENT DOCUMENTS

| 5,808,973 | A  | * | 9/1998 | Tanaka ........................ 369/14 |
| 6,243,350 | B1 | * | 6/2001 | Knight et al. ............... 369/126 |
| 6,347,016 | B1 | * | 2/2002 | Ishida et al. ................. 360/17 |
| 6,529,341 | B1 | * | 3/2003 | Ishida et al. ................. 360/48 |

FOREIGN PATENT DOCUMENTS

| JP | 63-183623  | 7/1988  |
| JP | 10-40544   | 2/1998  |
| JP | 10-040544  | 2/1998  |
| JP | 10-269566  | 10/1998 |
| JP | 11-25455   | 1/1999  |

OTHER PUBLICATIONS

"A Novel Magnetic Contact Duplication Technique for Servo–Writing on Magnetic Disks."; R. Sugita et al.; INTERMAG 2000, 2000 IEEE International Magnetics Conference, Ontario, Canada; Apr. 9–13, 2000.
" A Novel Magnetic Contact Duplication Technique for Servo–Writing on Magnetic Disks"; R. Sugita et al.; IEEE Transactions on Magnetics vol. 36, No. 5; Sep. 2000; pp. 2285–2287.

* cited by examiner

Primary Examiner—David Hudspeth
Assistant Examiner—Glenda P Rodriguez
(74) Attorney, Agent, or Firm—Rossi & Associates

(57) ABSTRACT

Recording of preformat information is accomplished by magnetic transfer to a perpendicular magnetic recording medium with a higher density. The method includes: (1) an initialization step, in which a magnetic field is applied to the magnetic recording medium in the direction perpendicular to the medium surface and direction of magnetization of the whole surface of the magnetic recording medium is aligned to one direction perpendicular to the medium surface, and (2) a magnetic transfer step, in which a magnetic field in the longitudinal direction is applied to both a master disk carrying preformat information and the magnetic recording medium with the master disk in close contact with or in proximity to one or both surfaces of the magnetic recording medium.

17 Claims, 11 Drawing Sheets

POSITIONAL RELATIONSHIP BETWEEN TRANSER SIGNALS AND SOFT MAGNETIC PATTERN

DISTRIBUTION OF A PERPENDICULAR COMPONENT OF THE MAGNETIC FLUX ON THE MEDIUM SURFACE

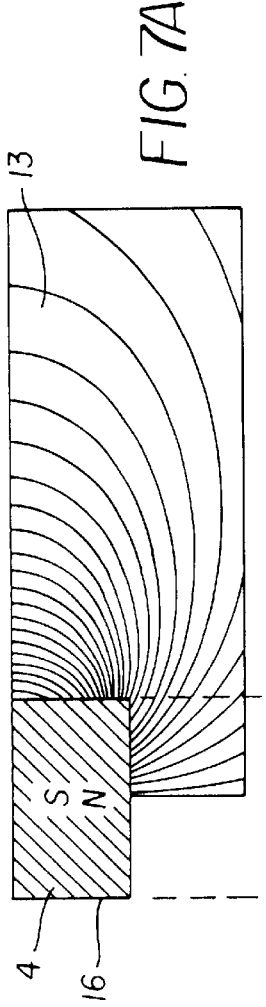
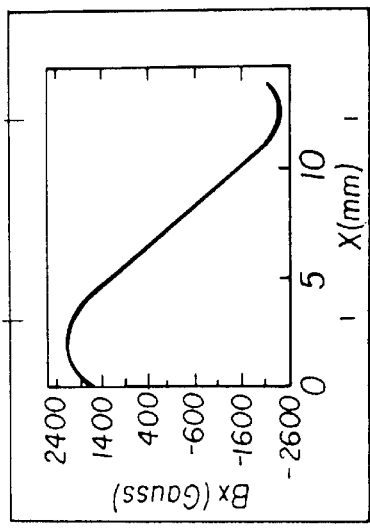
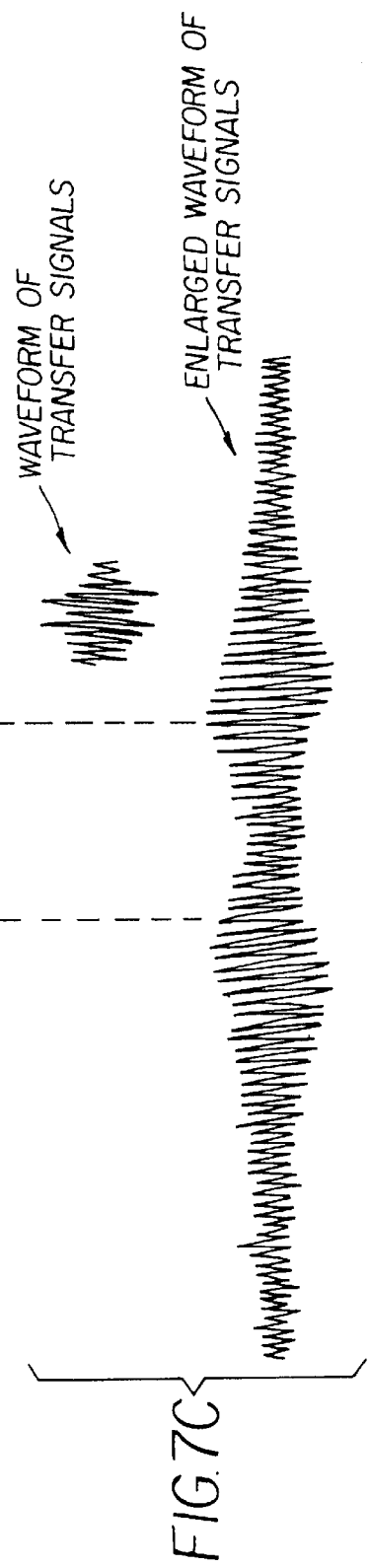
FIG. 7A
FIG. 7B
FIG. 7C

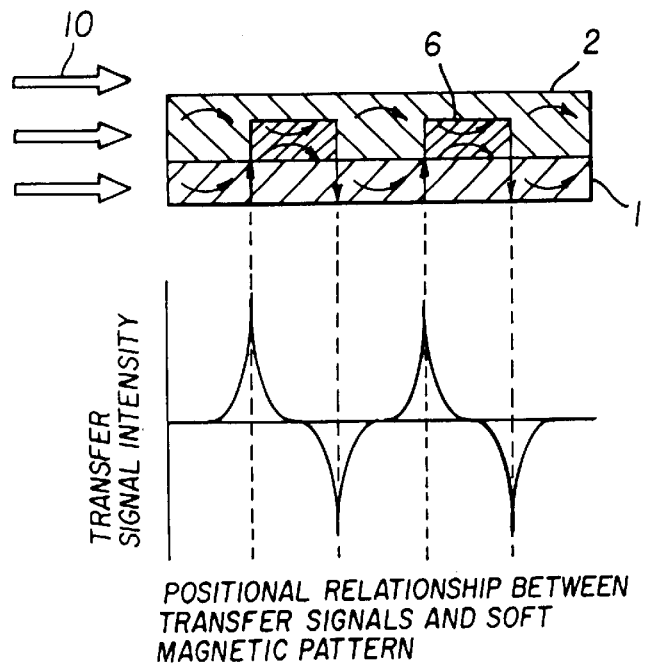
FIG. 8A
POSITIONAL RELATIONSHIP BETWEEN TRANSFER SIGNALS AND SOFT MAGNETIC PATTERN
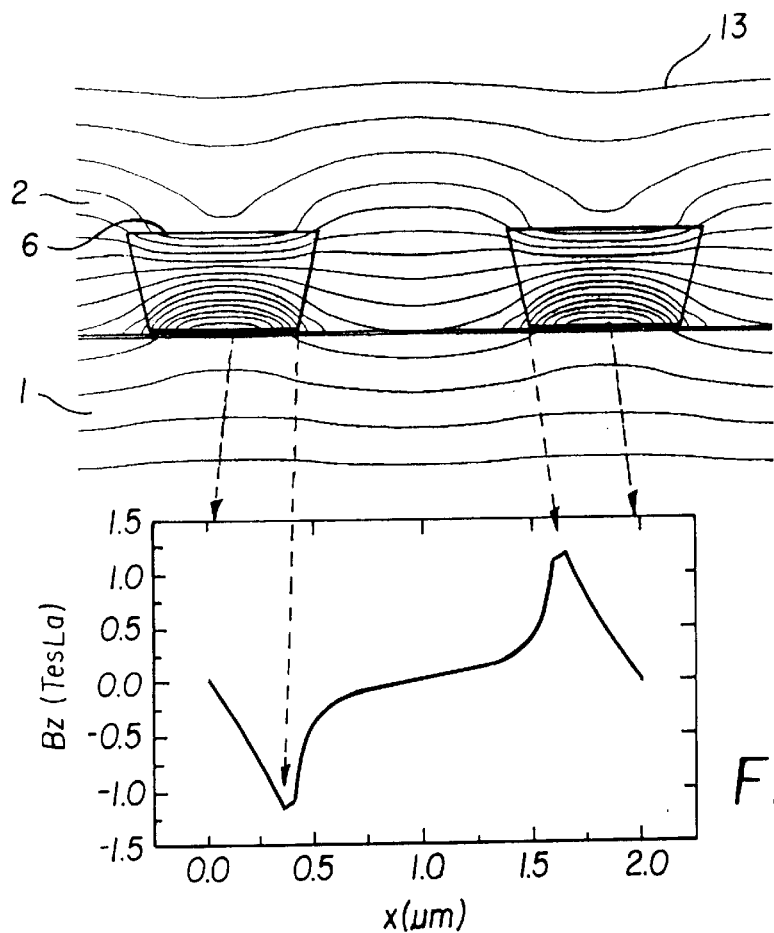
FIG. 8B
FIG. 8C
DISTRIBUTION OF PERPENDICULAR COMPONENT OF MAGNETIC FLUX ON THE MEDIUM SURFACE

METHOD OF MAGNETIC TRANSFER FOR PERPENDICULAR RECORDING MEDIUM

FIELD OF THE INVENTION

The present invention relates to a method for writing servo signals for positioning a read-write head into a magnetic disk surface by means of magnetic transfer technique in a hard disk drive (HDD) which uses magnetic film as recording material, is now a main stream of external memory. In particular, the present invention relates to magnetic transfer technique in a perpendicular magnetic recording medium, in which the direction of recorded magnetization is perpendicular to the medium surface.

BACKGROUND OF THE INVENTION

The recording density of a magnetic recording medium for HDD is as high as 20 Gbit/in$^2$ in the development stage at present and the memory capacity is increasing in the rate of 60% a year. With the enhancement of recording density, the size per bit of the magnetic material is diminishing. It is becoming difficult to read-write data by so-called longitudinal magnetic recording system, in which the direction of recorded magnetization is a longitudinal direction, that is, a direction in the surface of the magnetic recording medium. Accordingly, a so-called perpendicular magnetic recording system has been proposed, in which the direction of recorded magnetization is perpendicular to the surface of the magnetic recording medium. A perpendicular magnetic recording medium includes a magnetic recording layer of hard magnetic substance and a backing layer of soft magnetic material 16 that serves to concentrate the magnetic flux generated by the magnetic head and used for recording to the magnetic recording layer.

In a common HDD, recording and reproduction of data are performed with a magnetic head floating over the surface of the rotating magnetic recording medium of a hollow disk shape. The floating is effected by a floating mechanism called a slider and the flying height is several tens of nm. Bit information on the magnetic recording medium is stored in the data tracks concentrically positioned on the medium. In the recording and reproduction of data, a read-write head moves to the target data track with high speed. The recording surface of the magnetic recording medium contains preformat information that includes tracking servo signals for detecting relative position between the head and the data track, and address signals or regenerative clock signals. The preformat information corresponding to a data track is recorded on a circle concentric with the data track at certain angular intervals. The preformat information of the whole magnetic recording medium is recorded on linear preformat regions 35 with a sector form, which is substantially a linear form, arranged at certain angular intervals as shown in FIG. 11. For preventing the center of the row of preformat signals from diverting from the center of the magnetic recording medium or from the center of the orbit of the read-write head, the preformat information has been conventionally recorded using a special writing apparatus called a track writer after mounting the magnetic recording medium on the HDD.

Accompanying the above-described enhancement of recording density, the recording density of the preformat information is also increasing, to prolong the time for writing the preformat information. This is becoming a serious factor to lower efficiency in HDD production and to raise HDD cost.

Recently, a method for writing the preformat information to a magnetic recording medium has been proposed, in which the information is written to the recording medium in an a real manner by means of magnetic transfer technique using a master disk carrying the preformat information, in place of writing to each of the tracks with linear manner using the signal-writing head of a servo slider. For example, Japanese Unexamined Patent Application Publication (KOKAI) No. H10-40544 discloses a method for transferring preformat information to a longitudinal magnetic recording medium using a master disk that has protrusions and recesses, the protrusions being composed of ferromagnetic material. Japanese Unexamined Patent Application Publication (KOKAI) No. H11-25455 discloses a method for close contact between a master disk and a magnetic recording medium in the magnetic transfer process by means of supplying and exhausting air in the groove of the master disk. However, these references don't disclose a magnetic transfer method for a perpendicular magnetic recording medium.

A technology for magnetic transfer to a perpendicular magnetic recording medium that is a recording medium where the direction of magnetization for recording is perpendicular to the medium surface has never been devised. FIG. 3(A) and FIG. 3(B) show an initialization step and a transfer step, respectively, in a devised magnetic transfer method to a perpendicular recording medium 1. The structure of a master disk 2 used in the method is the same as that in the case of a longitudinal magnetic recording medium. In the step for initializing the perpendicular magnetic recording medium 1, a magnetic field perpendicular to the magnetic recording medium 1 surface is applied using single magnetic pole heads 16 as illustrated in the FIG. 3(A). Two single magnetic pole heads 16 and 16 are symmetrically arranged such that the two magnetic poles of different polarity are opposing with the medium put between the poles. This arrangement is taken because (1) spread of magnetic field in the longitudinal direction is smaller than in the case using one single magnetic pole head 16, and (2) only perpendicular component of magnetic field is applied to the medium. In the step for transferring, the master disk 2 is closely contacted to the medium, and two single magnetic pole heads 16 and 16 are likewise symmetrically arranged such that the two magnetic poles of different polarity are opposing with the master disk 2 and the medium put between the poles, as shown in FIG. 3(B). Here, the direction of the magnetic field is reversed in the transfer step from in the initialization step.

FIG. 4 also shows a prior art, in which one single magnetic pole head 16 having a yoke 7 is used. In the opposite side of the medium to the head, a thick plate made of soft magnetic substance called a back pole 8 is provided in place of a single magnetic pole head. This arrangement leads the magnetic flux 9 generated by the permanent magnet 4 through the yoke 7 and the back pole 8 so that the magnetic field is perpendicular to the medium surface 1.

FIG. 5(A), FIG. 5(B) and FIG. 5(C) show a principle of magnetic transfer in a perpendicular magnetic recording medium 1. FIG. 5(B) and FIG. 5(C) show magnetic field distribution when a magnetic field is applied to the master disk 2 and the recording medium 1 closely contacted each other, with the field direction perpendicular to their surfaces, using lines of magnetic force 13 and a graph showing the distribution of perpendicular component of the magnetic field. When a uniform and perpendicular magnetic field is applied to the master disk 2, the uniform flux is concentrated to the embedded soft-magnetic material 6 having high permeability. Hence, magnetic flux density or magnetic field intensity in the recording medium is large in the position the soft-magnetic material 6 is arranged and small in the position in the space between the soft-magnetic material 6, as shown in FIG. 5(B). If a perpendicular magnetic recording medium 1 having coercive force Hc of proper value is used, the direction of magnetization in the region of the medium beneath the soft-magnetic material 6 can be reversed in the transfer step from the direction in the initialization step; in FIG. 5(A), the direction is reversed from upward to downward. In the region of the medium beneath the space area where the soft-magnetic material 6 does not exist, the magnetization is not reversed and the direction of magnetization holds. FIG. 5(A) illustrates above-described situation and the distribution of intensity of signals when the magnetization transferred to the perpendicular magnetic recording medium 1 is read out.

According to the principle of magnetic transfer in a perpendicular magnetic recording medium 1 shown in FIG. 5(A), FIG. 5(B) and FIG. 5(C), if the difference in values of magnetic field intensity at the soft-magnetic material 6 and magnetic field intensity at the space without the soft-magnetic material 6 is significant, in other words, if almost entire magnetic flux is concentrated in the soft-magnetic material 6 so that the magnetic field intensity is large at the soft-magnetic material 6 and nearly zero at the space without the soft-magnetic material 6, the magnetization in the recording layer beneath the soft-magnetic material 6 is reversed and the initial magnetization in the recording layer beneath the space without the soft-magnetic material is conserved, which is an ideal circumstance for the magnetic transfer.

Concentrating large portion of magnetic flux in the soft-magnetic material 6 requires a thicker soft-magnetic embedded layer, as well as a higher permeability of the soft magnetic substance. Thickness of the soft-magnetic material 6 is generally from 300 nm to 500 $\mu$m at present. The line width in the longitudinal direction of the soft-magnetic material 6 is 1 $\mu$m, or the width of the space without the soft-magnetic material 6 is 1 $\mu$m. To raise the density of the servo information that is written by magnetic transfer, the length of the soft-magnetic material 6 along the circumferential direction of the magnetic recording medium must become finer. However, to obtain finer pattern, the thickness of the soft-magnetic material 6 is necessary to be thinner. Therefore, coexistence of the fine pattern and the ideal magnetic transfer is difficult.

It is therefore an object of the present invention to provide a method of magnetic transfer for a perpendicular magnetic recording medium 1 without increasing the thickness of the soft-magnetic material 6 than the present value.

SUMMARY OF THE INVENTION

The first embodiment of the present invention is a method for magnetically transferring preformat information to a magnetic recording layer of the magnetic recording medium by applying an external magnetic field in an arrangement where a master disk is in close contact with or in proximity to the magnetic recording medium, the master disk having a non-magnetic substrate and a multiple of isolated soft magnetic material on a surface or in a surface portion of the non-magnetic substrate, the soft magnetic material having a pattern corresponding to the preformat information and being disposed in a linear region. The method includes: (1) an initialization step, in which a magnetic field is applied to the magnetic recording medium in a direction perpendicular to a surface of the magnetic recording medium so that direction of magnetization of whole surface of the magnetic recording medium is aligned to one direction perpendicular to the magnetic recording medium, and (2) a magnetic transfer step, in which a magnetic field in a longitudinal direction is applied to both of the master disk and the magnetic recording medium in an arrangement where the master disk is in close contact with or in proximity to one surface or both surfaces of the magnetic recording medium.

Preferably, in the initialization step, a magnetic field is applied to the magnetic recording medium in perpendicular direction (with respect to the medium surface) of the medium using a single magnetic pole head, and in the magnetic transfer step, a magnetic field in a longitudinal direction is applied to the magnetic recording medium and the master disk using one or more ring heads each having a gap.

The second embodiment of the present invention is a method for magnetically transferring preformat information to a magnetic recording layer of the magnetic recording medium by applying an external magnetic field in an arrangement where a master disk is in close contact with or in proximity to the magnetic recording medium, the master disk having a non-magnetic substrate and a multiple of isolated soft magnetic material on a surface or in a surface portion of the non-magnetic substrate, the soft magnetic material having a pattern corresponding to the preformat information and being disposed in a linear region. The method includes: (1) a step for preparing as the magnetic recording medium an uninitialized magnetic recording medium as obtained from a manufacturing step, and (2) a magnetic transfer step, in which a magnetic field in a longitudinal direction is applied to both of the master disk and the magnetic recording medium in an arrangement where the master disk is in close contact with or in proximity to one surface or both surfaces of the magnetic recording medium.

Preferably, in the magnetic transfer step, a magnetic field in a longitudinal direction is applied to the magnetic recording medium and the master disk using one or more ring heads each having a gap.

In a magnetic transfer step of first and second embodiments of the present invention, as heads for transfer magnet, preferably, two ring heads each having a gap are opposed each other, and the magnetic recording medium and the master disk are positioned in a center of the gaps of the two ring heads.

In a magnetic transfer step of first and second embodiments of the method of magnetic transfer for a perpendicular magnetic recording medium of the present invention, preferably, the magnetic recording medium has an axis of easy magnetization in a direction perpendicular to a surface of the medium.

In a magnetic transfer step of first and second embodiments of the method of magnetic transfer for a perpendicular magnetic recording medium of the present invention, preferably, the direction of recorded magnetization in said magnetic recording medium is perpendicular to said magnetic recording medium.

BRIEF DESCRIPTION OF THE DRAWINGS

The invention will now be described with reference to certain preferred embodiments thereof and the accompanying drawings, wherein:

FIG. 3(A) shows an initialization step and FIG. 3(B) shows a transfer step;

FIG. 4(A) shows an initialization step and FIG. 4(B) shows a transfer step;

FIG. 5(A) shows a positional relationship between transfer signals and soft magnetic material 16, FIG. 5(B) shows lines of magnetic force in a perpendicular magnetic recording medium and a master disk, and FIG. 5(C) is a graph showing density distribution of perpendicular component of magnetic flux on the surface of the perpendicular magnetic recording medium;

FIG. 7(A), FIG. 7(B) and FIG. 7(C) show lines of magnetic force, perpendicular component of magnetic flux on the surface of a magnetic recording medium, and transfer signals in the magnetic transfer using a single magnetic pole head; FIG. 7(A) shows lines of magnetic force in the neighborhood of the single magnetic pole head, FIG. 7(B) is a graph showing longitudinal component of magnetic flux on the surface of the magnetic recording medium, and FIG. 7(C) shows transfer signals;

FIG. 8(A), FIG. 8(B) and FIG. 8(C) explain a method for magnetic transfer to a perpendicular magnetic recording medium according to the present invention; FIG. 8(A) shows a positional relationship between transfer signals and soft magnetic material 16, FIG. 8(B) shows lines of magnetic force in a perpendicular magnetic recording medium and a master disk, and FIG. 8(C) is a graph showing density distribution of perpendicular component of magnetic flux on the surface of the perpendicular magnetic recording medium;

FIG. 9(A) shows a case using a ring head, and FIG. 9(B) shows a case using a single magnetic pole head;

DETAILED DESCRIPTION OF THE INVENTION

Figure 12:
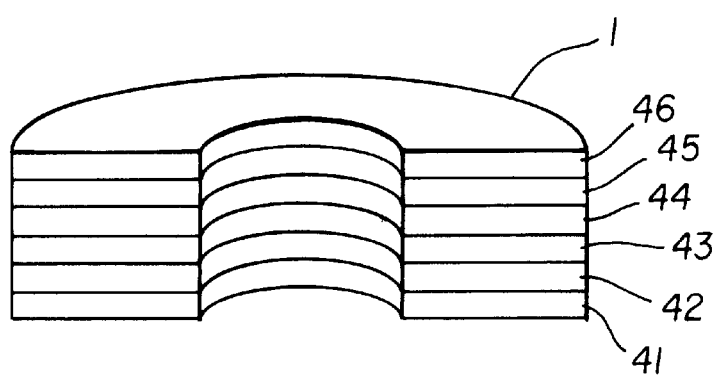
FIG. 12 is a bird's-eye view with a partial cross-section of a magnetic recording medium used in the present invention.

A structure of a typical perpendicular magnetic recording medium 1 in accordance with the present invention is shown in FIG. 12. The perpendicular magnetic recording medium 1 includes a non-magnetic substrate 41, and at least a soft-magnetic backing layer 42 and a magnetic recording layer 44 sequentially formed on the non-magnetic substrate 41. A protective layer 45 and liquid lubricant layer 46 may further be formed on the magnetic recording layer 44. Still further, an under-layer 43 may be formed between the soft magnetic backing layer 42 and the magnetic recording layer 44.

The non-magnetic substrate 41 is preferably a hollow disk having a round hole in the central portion thereof, which is commonly used in a longitudinal magnetic recording medium. The hollow disk may be made of NiP plated Al alloy, reinforced glass, or crystallized glass. Amorphous cobalt alloy is preferably used for soft-magnetic layer 42, while NiFe alloy or Sendust alloy that is a FeSiAl alloy may also be used. The amorphous cobalt alloy may be obtained by adding a metal element or elements selected from the group consisting of Zr, Nb, Ta, Hf, Ti and W, to cobalt. Ferromagnetic material of an alloy containing at least cobalt and chromium is preferably used in magnetic recording layer 44. For the ferromagnetic material to be used in a perpendicular magnetic recording medium 1, it is necessary that the c-axis of a hexagonal closest packed structure of the ferromagnetic material takes orientation in the direction perpendicular to the recording surface of the magnetic recording medium. Namely, the axis of easy magnetization of the ferromagnetic material is required to be in the direction perpendicular to the recording surface. It is also important for the material of the magnetic recording layer 44 that the coercive force in the perpendicular direction is much larger than the coercive force in the longitudinal direction. In order to favorably control crystalline orientation and grain size of the magnetic recording layer 44, an under-layer 43 made of Ti or TiCr alloy, for example, may be provided between the soft magnetic layer 42 and the magnetic recording layer 44. A thin film consisting principally of carbon may be used for the protective layer 45. Perfluoropolyether lubricant may be used for the liquid lubricant layer 46.

Figure 10:
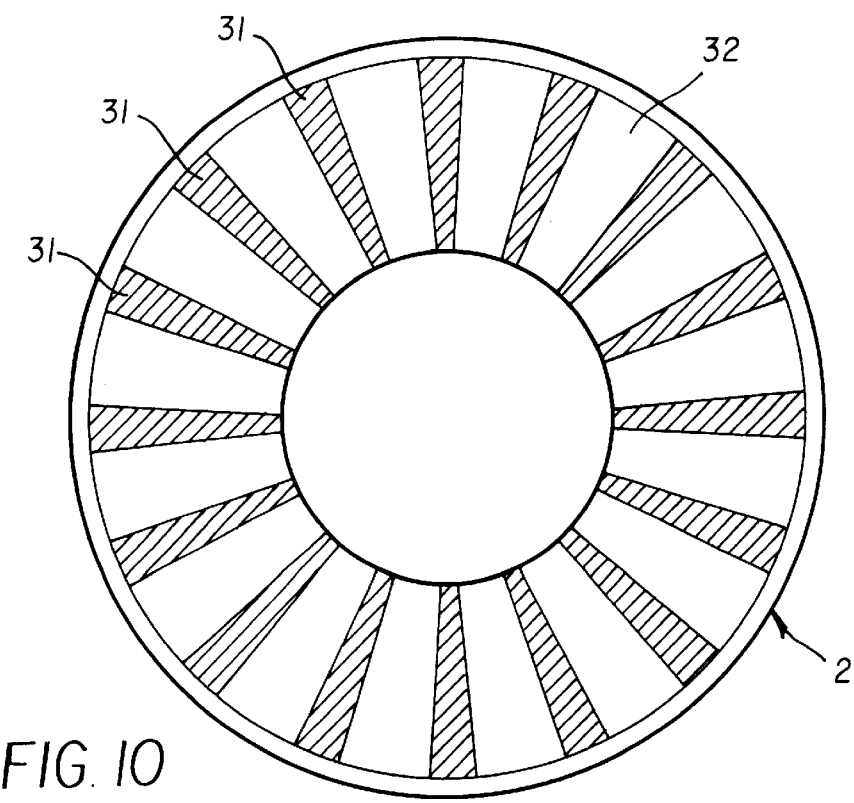
FIG. 10 is a plan view of a master disk used in the present invention.

A master disk 2 illustrated in FIG. 10 that is used in a conventional longitudinal magnetic recording medium may be used as a master disk 2 in the present invention. The master disk 2 includes a master disk non-magnetic substrate 32 and soft magnetic material 6 disposed in a plurality of linear regions 31, and have pattern corresponding to the preformat information on the surface or in the surface portion of the master disk non-magnetic substrate 32.

Here, "a pattern corresponding to the preformat information" refers to a pattern used for magnetically transferring the preformat information to the magnetic recording medium 1. The pattern depends on the specifications of the HDD, and the pattern used in a conventional longitudinal magnetic recording medium may also be used. The pattern is generally disposed in the linear regions 31 extending radially in the master disk 2 and arranged periodically at a certain angular interval as shown in FIG. 10.

The master disk non-magnetic substrate 32 may be made of glass, silicon, or resin depending on a method for forming the soft-magnetic material 6 pattern. The master disk non-magnetic substrate 32 has a size corresponding to the magnetic recording medium to be transferred, and preferably has the same shape and size as those of the magnetic recording medium. Thickness of the master disk non-magnetic substrate 32 is preferably from 0.2 mm to 0.5 mm depending on the production conditions including the magnetic recording medium to be used and the magnetic field intensity.

The soft-magnetic material of the master disk 2 preferably has a permeability that is substantially larger than the longitudinal permeability of the magnetic recording layer 44 of the magnetic recording medium 1. Namely, a relative permeability value of 100 or larger is preferable. By selecting such material, a large magnetic field can be generated in the perpendicular direction of the magnetic recording layer 44 of the magnetic recording medium 1 when a longitudinal magnetic field is applied by a head for magnetic transfer, as described later in detail. Preferably the soft-magnetic material 6 includes pure cobalt. As previously described, thickness of the soft-magnetic material 6 is preferably large from the viewpoint of magnetic flux concentration, while the thickness is required to be small for higher density of preformatted information. Thus, the optimum value of the thickness exists, and preferably in the range from 200 nm to 500 nm, more preferably 250 nm to 350 nm, most preferably 300 nm. The soft-magnetic material 6 of the master disk 2 may be placed on the surface of the master disk non-magnetic substrate 32 or in the surface region of the substrate 32. To place on the surface refers to depositing the soft-magnetic material 6 on the surface of the substrate 32 in a certain pattern. To place in the surface region of the substrate 32 refers to forming depressions with a certain desired pattern on the surface region of the substrate 32 and to embed the soft-magnetic material 6 in the depressions.

Figure 3A:
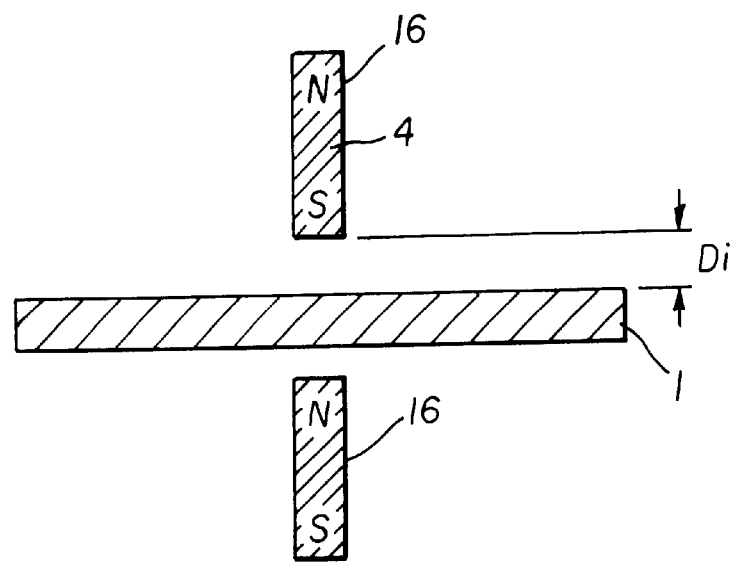
FIG. 3(A) and FIG. 3(B) explain a conventional magnetic transfer method to a perpendicular magnetic recording medium using a single magnetic pole head.
Figure 3B:
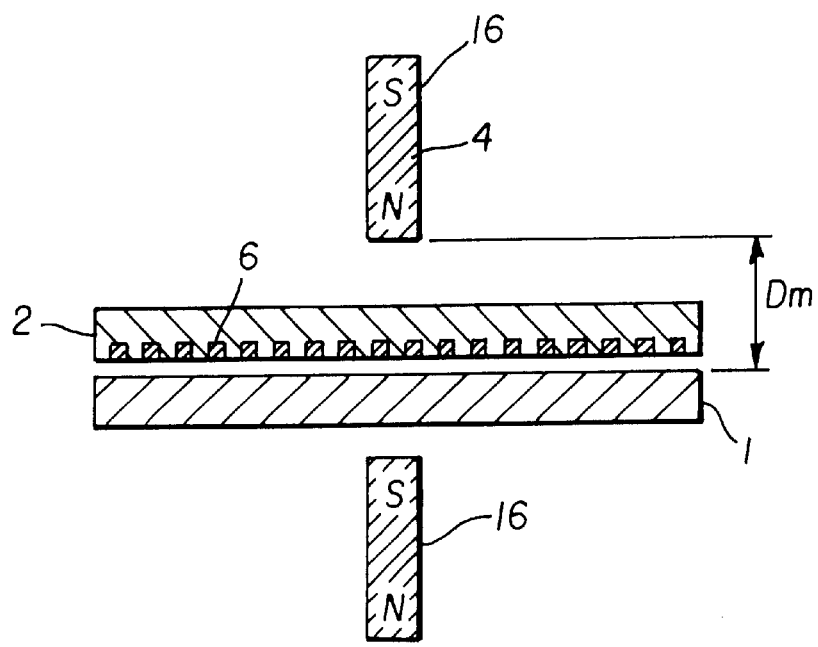
Figure 4A:
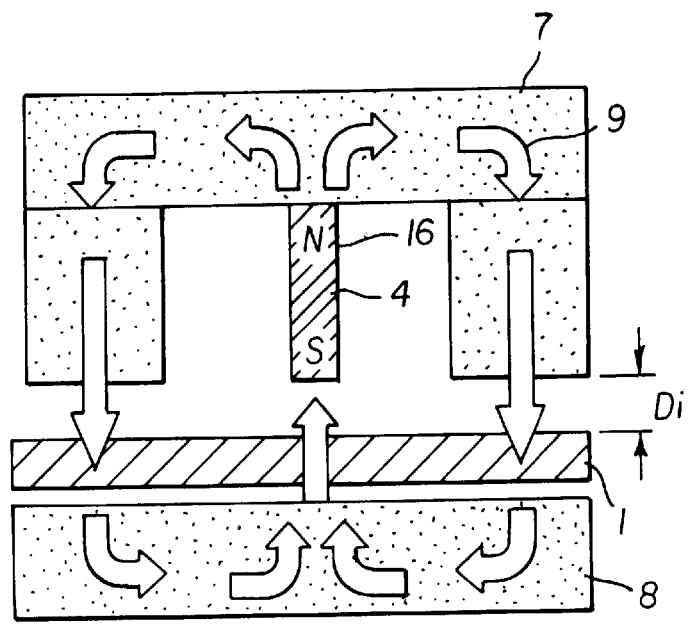
FIG. 4(A) and FIG. 4(B) explains a conventional magnetic transfer method to a perpendicular magnetic recording medium using a single magnetic pole head 16 having a soft magnetic yoke.
Figure 4B:
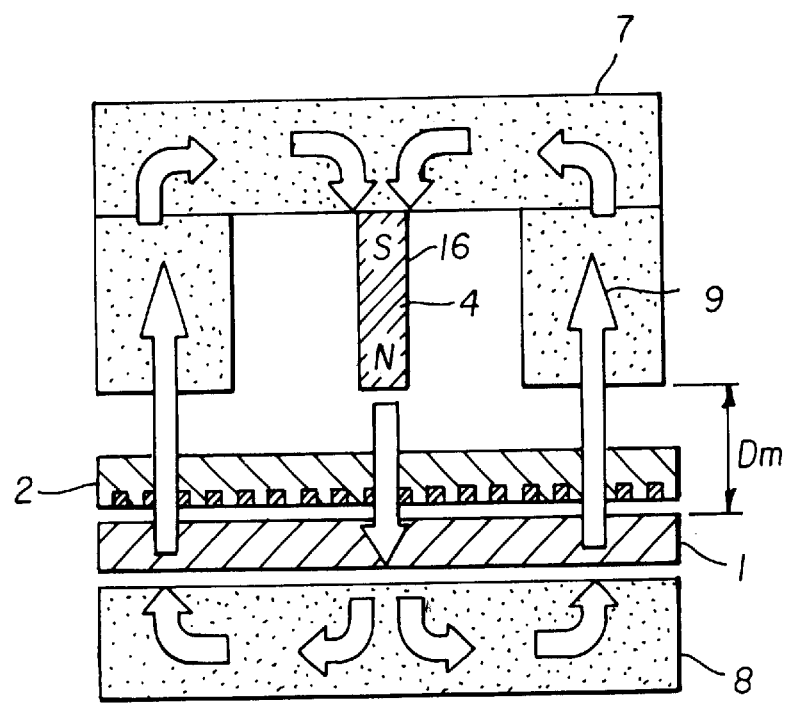

The initialization step of the present invention is performed by applying a magnetic field to the perpendicular magnetic recording medium 1 with the field direction perpendicular to the medium surface, as is conventionally employed. For example, two opposing single magnetic pole heads 16 and 16 may be used as shown in FIG. 3(A), or a head having a yoke 7 and a back pole 8 may be used as shown in FIG. 4(A). The magnetic field applied in the initialization step is necessary to be larger than coercive force in the perpendicular direction of the magnetic recording layer 44 of the perpendicular magnetic recording medium 1, and the magnetic field with the intensity of 0.4 to 1 T (Tesla) is generally employed. Although the field to be applied may contain a component in the longitudinal direction of the perpendicular magnetic recording medium 1, the intensity is preferably smaller than the coercive force in the longitudinal direction of the magnetic recording layer 44 of the perpendicular magnetic recording medium 1.

Figure 1:
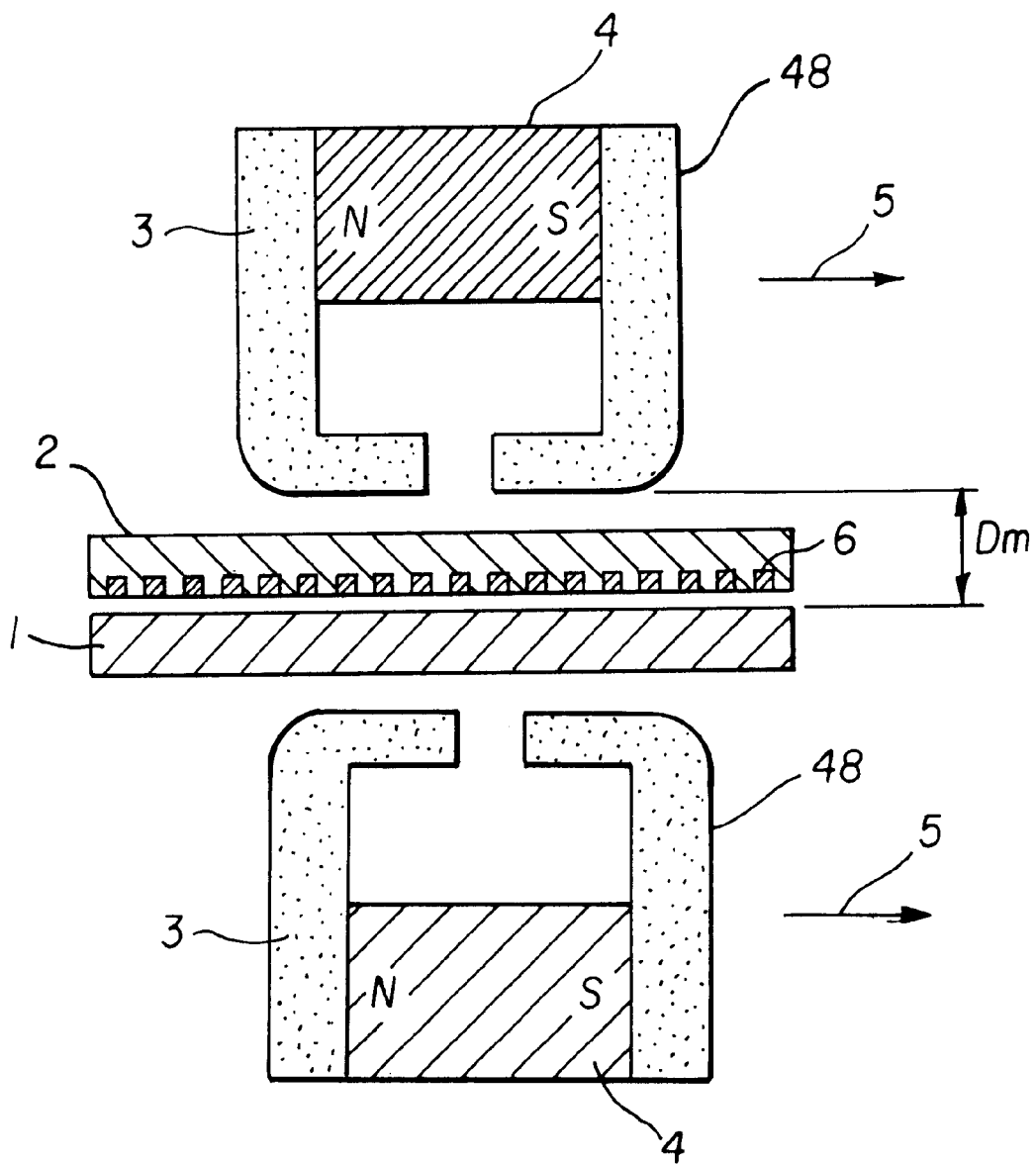
FIG. 1 shows a transfer step in an example of embodiments of the present invention.
Figure 2:
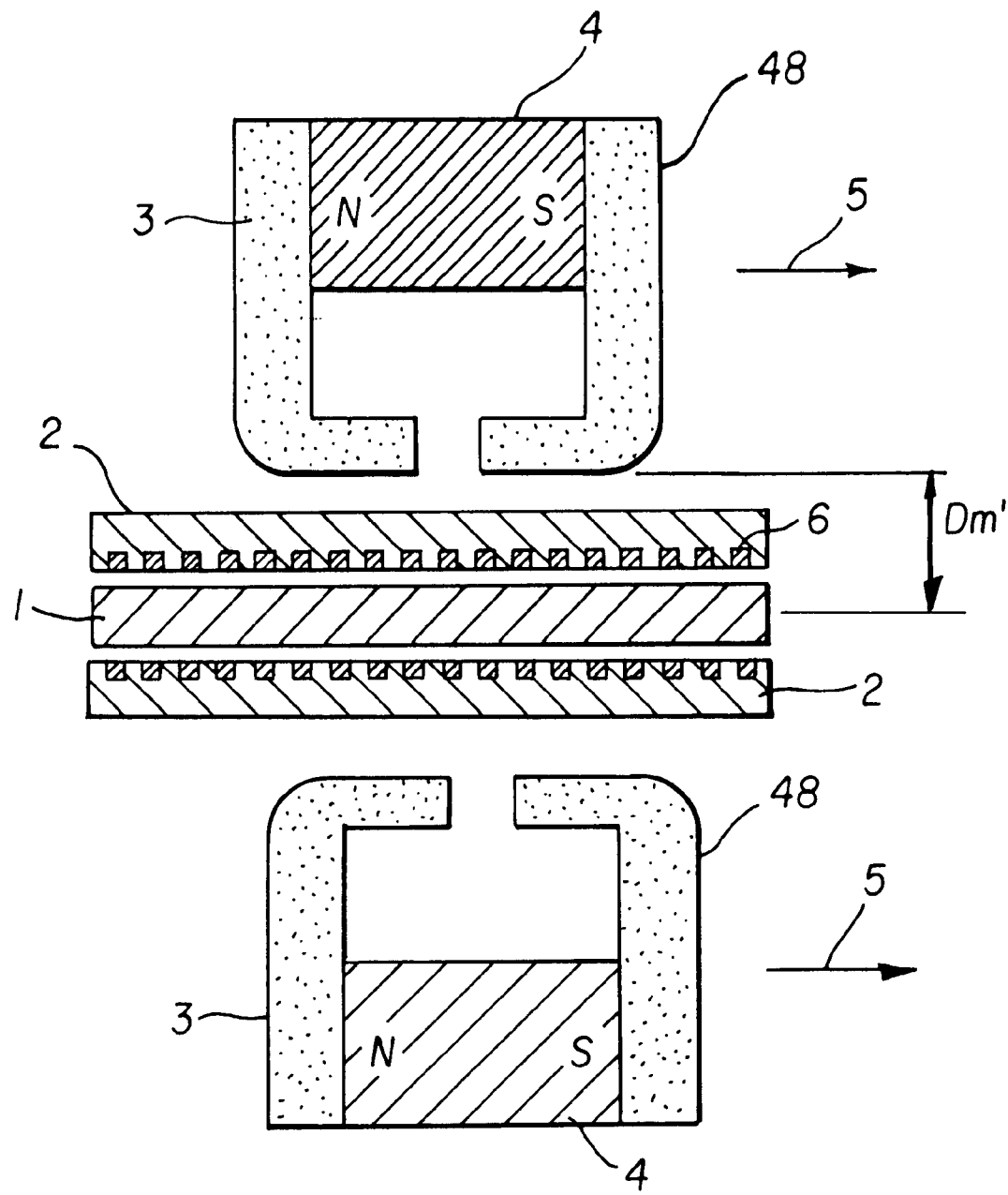
FIG. 2 shows a transfer step in an example of embodiments of the present invention.

The magnetic transfer step of the present invention is performed by applying a magnetic field to a combination of the perpendicular magnetic recording disk 1 and a master disk 2 with the field direction in the longitudinal direction of the medium surface, in which the combination consists of the recording medium 1 and a master disk 2 that is in close contact with or in proximity to a surface of the medium 1 or consists of the recording medium 1 and two master disks 2 and 2 that are in close contact with or in proximity to two surfaces of the medium. FIG. 1 shows the arrangement in which a master disk 2 is disposed on a surface of the recording medium 1, and FIG. 2 shows the arrangement, in which two master disks 2 and 2 are disposed on both surfaces of the recording medium 1.

A magnetic head used for applying a longitudinal magnetic field in the magnetic transfer step of the present invention may be a ring head 48 including a permanent magnet 4 and yoke 3 attached to both poles of the permanent magnet 4 as shown in FIG. 1. A gap is formed between the tips of the yoke 3. The gap is opposite to the master disk 2 in operation. The width of the gap of the ring head 48 is preferably in the range from 3 mm to 6 mm depending on the master disk 2 and the magnetic recording medium 1 that are used. Although the ring head 48 provided with a permanent magnet 4 is illustrated in FIG. 1 and FIG. 2, the permanent magnet may, of course, be replaced by a solenoid coil with an appropriate size or other means known by the skilled person. The magnetic head generates a magnetic field in the longitudinal direction of the magnetic recording medium in the magnetic transfer step of the invention. The intensity of the generated magnetic field is preferably in the range from 0.4 to 1 T, depending on the coercive force and permeability in perpendicular and longitudinal directions of the magnetic recording layer 44 of the magnetic recording medium 1, permeability of the soft-magnetic material 6 of the master disk 2, and the shape of the magnetic head.

The master disk 2 is disposed in close contact with or in proximity to the perpendicular magnetic recording medium 1. The surface of the master disk 2 opposite to the perpendicular magnetic recording medium 1 is the surface that includes soft-magnetic material 6 portions carrying the preformat information. "To dispose the master disk in proximity to the recording medium" refers to limiting the distance between the surface of the master disk 2 and the opposite surface of the perpendicular magnetic recording medium 1 to 1 mm or less.

In the magnetic transfer step of the invention, the two ring heads 48 and 48 are preferably positioned opposite each other and generate a magnetic field in the longitudinal direction of the magnetic recording medium 1. Physical shape and intensity distribution of the generated magnetic field need to be identical between the two ring heads 48 and 48. In the case in which one master disk 2 is placed on one surface of the perpendicular magnetic recording medium 1 as illustrated in FIG. 1, the surface of the perpendicular magnetic recording medium 1 in close contact with or in proximity to the master disk 2 is positioned in the center of two ring heads 48 and 48, in more detail, in the center of the two gaps. In other words, the two ring heads 48 and 48 are positioned symmetrically to each other with respect to the surface of the perpendicular magnetic recording medium 1 in close contact with or in proximity to the master disk 2. In the case in which two master disks 2 and 2 are placed on both surfaces of the perpendicular magnetic recording medium 1 as illustrated in FIG. 2, a plane at the center of the perpendicular magnetic recording medium 1, which is in equal distance from the both surfaces of the magnetic recording medium is centered between the two ring heads 48 and 48.

Figure 9A:
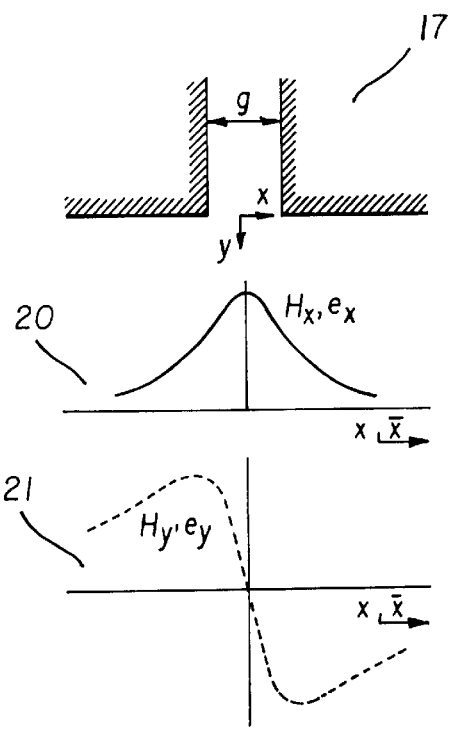
FIG. 9(A) and FIG. 9(B) show a perpendicular component and a longitudinal component of magnetic flux on the surface of a magnetic recording medium in a case using a ring head 48 and in a case using a single magnetic pole head 16.

The important point of these arrangement is that each of the polarity and the intensity distribution of the magnetic field generated by the two ring heads 48 and 48 are symmetrical with respect to the surface of the magnetic recording medium opposing the master disk 2 or with respect to the center plane of the perpendicular magnetic recording medium 1. A magnetic field generated by single ring head 48 contains a perpendicular component as well as a longitudinal component as shown in FIG. 9(A). By arranging the ring heads 48 and 48 symmetrically as shown in FIG. 1 and FIG. 2, the perpendicular magnetic field component can be cancelled around the of the perpendicular magnetic recording medium 1 surface or around the plane disposing the soft-magnetic material 6 embedded pattern of the master disk 2. Consequently, this arrangement allows the application of a longitudinal magnetic field only to the surface of the perpendicular magnetic recording medium 1 opposite to the master disk 2.

A distance Dm between the surface of the perpendicular magnetic recording medium 1 opposite to the master disk 2 and a medium-side plane of the gap of the ring head and distance Dm' between the center plane of the perpendicular magnetic recording medium 1 and a medium-side plane of the gap of the ring head 48 are to be optimized depending on the intensity of the magnetic field generated by the ring head 48, the shape of the soft-magnetic material 6 of the master disk 2, substance of the soft-magnetic material 6 layer, and magnetic property of the recording medium 1. Preferable ranges of Dm and Dm' are from 1 mm to 4 mm.

The magnetic transfer step of the invention is performed by moving the thus arranged ring heads 48 and 48 to the place at which preformat information is to be recorded. This movement of the ring heads 48 and 48 is necessary to be done along the longitudinal magnetic field generated by the ring heads. The ring heads 48 and 48 may be moved from N-pole to S-pole or S-pole to N-pole of the generated magnetic field. Specifically, each one of the ring heads is arranged such that the gap of the ring head is parallel to the radial direction of the recording medium 1 to which preformat information is transferred. The ring head generates a magnetic field while the medium 1 is rotating or the ring head is moving in the direction of the circumference of the medium.

Figure 11:
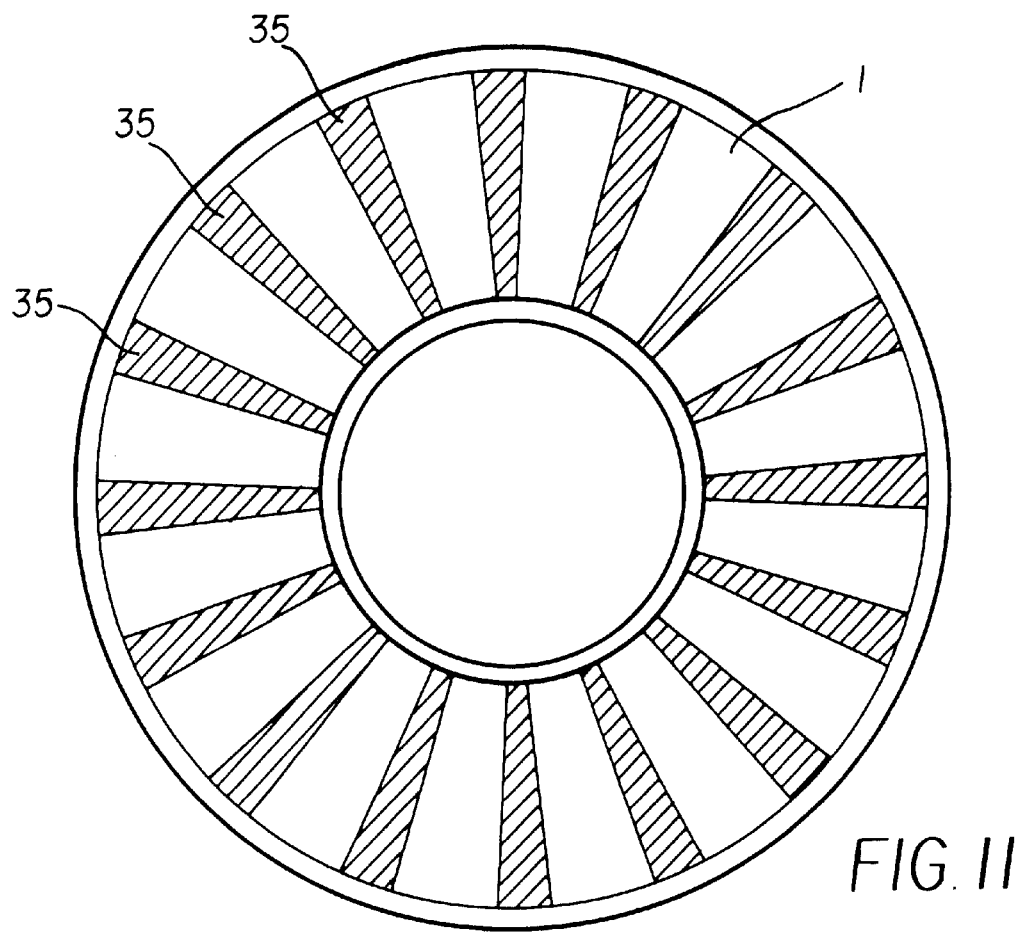
FIG. 11 is a plan view of a magnetic recording medium manufactured by a magnetic transfer step of the present invention.

Preformat information of the master disk 2 is transferred to a perpendicular magnetic recording medium 1 by employing above-described initialization step and magnetic transfer step. A perpendicular magnetic recording medium 1 to which preformat information is transferred from a master disk 2 having a structure shown in FIG. 10, for example, records the preformat information in linear preformat regions 35 extending in the radial direction of the magnetic recording medium 1 and located periodically with a certain angular interval as shown in FIG. 11.

Although above-described method includes the initialization step before magnetic transfer step, a method of the second embodiment of the present invention does not utilize an initialization step and carries out magnetic transfer step using a magnetic recording medium as obtained from a medium production process, that is, an uninitialized medium. The second embodiment of the invention is possible because in the magnetic transfer using a longitudinal magnetic field 10 in the invented method, magnetic field for transfer in the perpendicular direction, the field being generated by longitudinal field 10 applied to the master disk 2, has intense peaks at both edges of the soft-magnetic material 6 and opposite directions at the edges, as shown in FIG. 8(C), while details will be described later. Therefore, a pattern of magnetization transition can be recorded on the magnetic recording medium 1 only by a transfer step without initialization.

Figure 13:
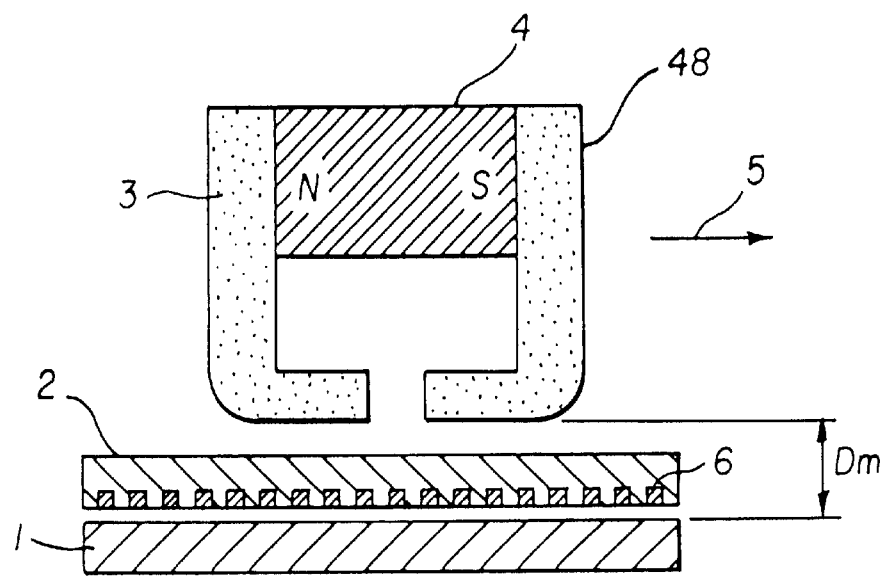
FIG. 13 shows a transfer step in an example of embodiments of the present invention.
Figure 14:
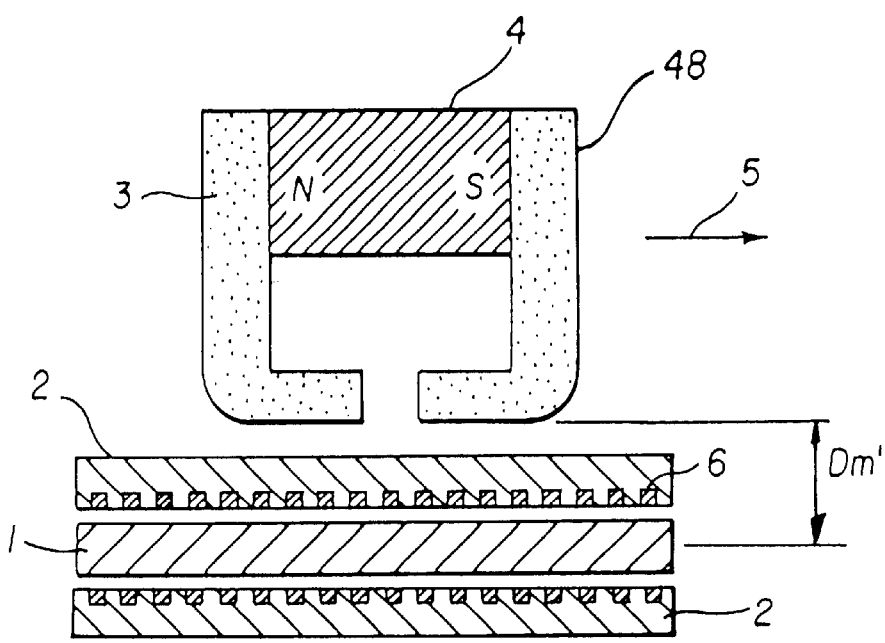
FIG. 14 shows a transfer step in another example of embodiments of the present invention.

The arrangement in which two opposing ring heads 48 and 48 are utilized in the magnetic transfer step in the invention has mostly been described so far. However, magnetic transfer is possible using one ring head 48 in the present invention. Arrangements in magnetic transfer using one ring head 48 are shown in FIG. 13 and FIG. 14. The same conditions for the gap width and the magnetic field intensity as previously described may also be employed in a magnetic transfer using one ring head 48. Values for Dm and Dm' are preferably in the range from 0.6 to 2.4 mm in order to apply a desired magnetic field to the perpendicular magnetic recording medium 1 by using one ring head. The ring head 48 may be placed either on the side of the master disk 2 or on the side of the recording medium 1. Use of one ring head 48 is beneficial for avoiding complexity and high cost of the transfer devise.

The benefits of the magnetic transfer step of the present invention using two opposing ring heads 48 and 48 will be described in the following in comparison with the case using one single magnetic pole head 16. The perpendicular magnetic recording medium 1 in the following description is assumed to be magnetized in the initialization step uniformly upward on the drawings.

Figure 6:
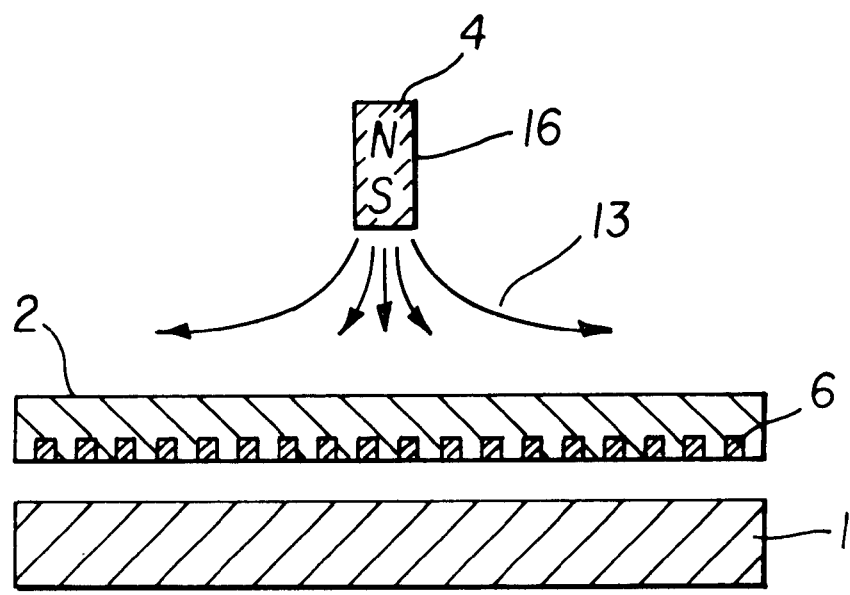
FIG. 6 shows lines of magnetic force in magnetic transfer using a single magnetic pole head.

FIG. 6 shows an arrangement of a magnetic recording medium 1, a master disk 2, and a single magnetic pole head 16 in an experiment of a magnetic transfer step using one single magnetic pole head 16. We consider magnetic transfer in the arrangement of FIG. 6. In this experiment, the magnetic recording medium 1 is fixed and not moved relative to the transferring magnet. So, magnetic transfer is done right under the transferring magnet or in their neighborhood. Since only one single magnetic pole head 16 is used, the generated magnetic field spreads toward longitudinal direction as the lines of magnetic force 13 shown in the figure, and includes a longitudinal component and a perpendicular component.

FIG. 7(A) shows the width of the used single magnetic pole head 16 and the lines of magnetic force 13 of the magnetic field generated by the head. FIG. 7(B) is a graph showing intensity distribution of the longitudinal component of the magnetic field generated by the single magnetic pole head 16 on the magnetic recording medium surface. FIG. 7(C) is a graph showing a transfer signal in the transfer with the arrangement of FIG. 6. The transfer signal has two linearly symmetric peaks of signal intensity. The distance between the peaks is from 11.8 mm to 13.5 mm. On the other hand, peaks in longitudinal component of magnetic field intensity distribution generated by the single magnetic pole head 16 on the medium surface exist at the positions corresponding to the edges of the single magnetic pole head 16. The positions nearly agree with the positions of two peaks in the signal intensity.

Figure 9B:
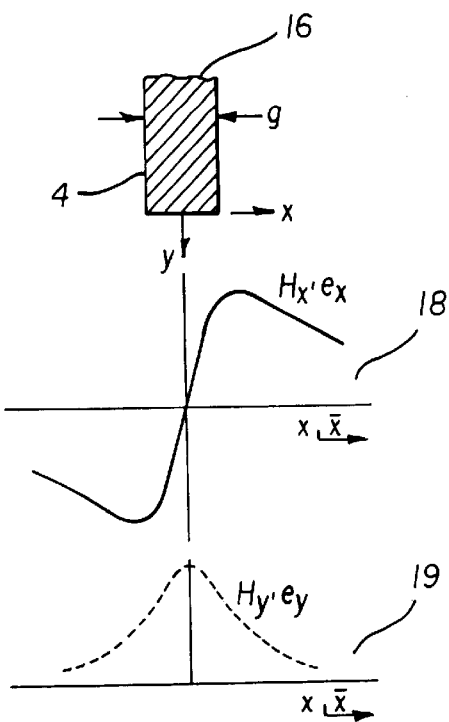

FIG. 9(B) shows longitudinal component and perpendicular component of a magnetic field generated by a single magnetic pole head 16. The magnetic field intensity distribution of a single magnetic pole head has two peaks in a longitudinal component 18 (a component in X-axis direction), existing at the positions corresponding to the width of the magnet, and one peak in a perpendicular component 19 (a component in Y-axis direction) at the position corresponding to the center of the magnet. The magnitude of the magnetic field intensity at the peak position of each of the longitudinal component 18 and the perpendicular component 19 is nearly the same. The distribution of transferred signal intensity in FIG. 7(C) shows that the two peaks strongly recording transfer signals corresponds to the two peaks in longitudinal magnetic field intensity, and that the transfer signals are recorded by a perpendicular magnetic field generated by application of magnetic field to the master disk. Effective transfer is not performed in the peak of the perpendicular component 19 of the magnetic field at the magnet center although the magnetic field intensity is nearly the same magnitude as of the longitudinal component. The result shows that the perpendicular transferring field generated by application of a longitudinal field to the master disk is more effective for magnetic transfer than the perpendicular transferring field generated by application of a perpendicular field to the master disk.

FIG. 8(A) shows a magnetic field that is generated by two ring heads 48 and 48 and applied in the longitudinal direction of a laminate of a perpendicular magnetic recording medium 1 and a master disk 2, and also shows intensity of transferred signals made by the field. Here, "a laminate of a perpendicular magnetic recording medium 1 and a master disk" refers to a pair of a perpendicular magnetic recording medium 1 and a master disk that are in close contact with or in proximity to each other. FIG. 8(B) shows lines of magnetic force 13 of the longitudinal magnetic field and FIG. 8(C) shows the distribution of perpendicular magnetic field generated by the longitudinal magnetic field. A magnetic field applied around the soft-magnetic material 6 of the master disk 2 is concentrated to the soft magnetic material 6 with high permeability and becomes a leakage flux in a space without the soft magnetic material 6. The magnetic field concentrated to the soft-magnetic material 6 and the leakage flux have each component perpendicular to the laminate, thus, the perpendicular magnetic field is generated and transfer signals are recorded. The generated perpendicular magnetic field has maximum intensity at the edges of the soft magnetic material 6, while the directions are opposite. If we assume the magnetic recording medium 1 is uniformly magnetized upward in the figure by initialization of the perpendicular magnetic recording medium 1, magnetization around right edge of the soft magnetic material 6 is reversed by the downward perpendicular magnetic field component generated in the transfer step. On the other hand, around left edge of the soft magnetic material 6, the generated perpendicular magnetic field is upward, which is the same direction as in the initialization magnetization, consequently, the direction of initial magnetization is not reversed and held.

To increase perpendicular magnetic field intensity that involves recording of transfer signals, the flux density in the soft magnetic material 6 is required to be large. As the magnetic flux density in the soft magnetic material 6 increases, the leakage flux in a space without the soft magnetic material 6 can be made large, and hence, enough transfer signal can be written. When a magnetic field is applied to a laminate including soft magnetic material 6, as permeability of the soft magnetic material 6 is higher and as a dimension of the pattern along the direction of the applied magnetic field, that is, length along the circumference of the magnetic recording medium 1 is larger, the magnetic flux is more concentrated to the soft magnetic material 6, and accordingly, the magnetic flux density in the soft magnetic material 6 becomes larger. As a result, leakage flux from the soft magnetic material 6, which is leakage flux for transferring, also is made larger. We consider a case where a magnetic field is applied to a master disk 2 in the longitudinal direction or in the perpendicular direction. Because a thick soft magnetic material 6 layer is difficult to be processed with a fine pattern, the thickness of the soft magnetic material 6 in the perpendicular direction can not be larger than the present value. The pattern size in the longitudinal direction, that is, length along the circumference of the magnetic recording medium is easier to be increased. When a magnetic field with the same intensity is to be applied to a master disk 2, a larger perpendicular magnetic field for transfer is generated by application of a longitudinal field according to the present invention than by application of a perpendicular field as in the conventional technology.

Superiority of the use of longitudinal field to the use of perpendicular field in transferring to a perpendicular magnetic recording medium 1 will be described in the following based on the difference of perpendicular magnetic field distribution impressed to the magnetic recording medium 1 shown in FIG. 5(C) and FIG. 8(C).

Figure 5A:
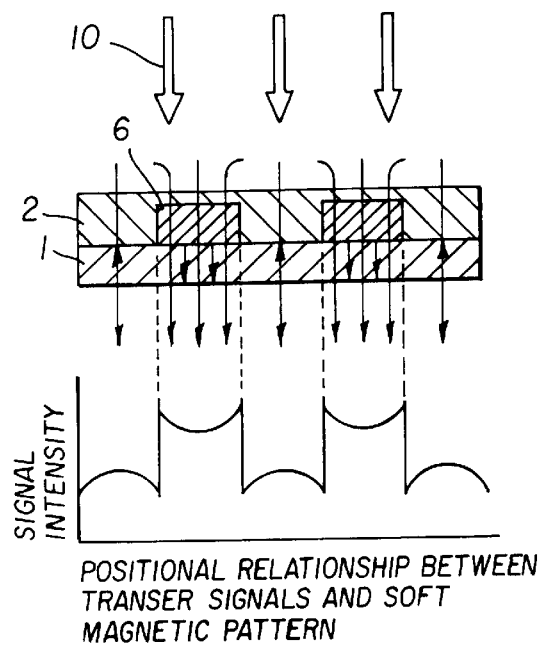
FIG. 5(A), FIG. 5(B) and FIG. 5(C) explain a conventional magnetic transfer method to a perpendicular magnetic recording medium.
Figure 5B:
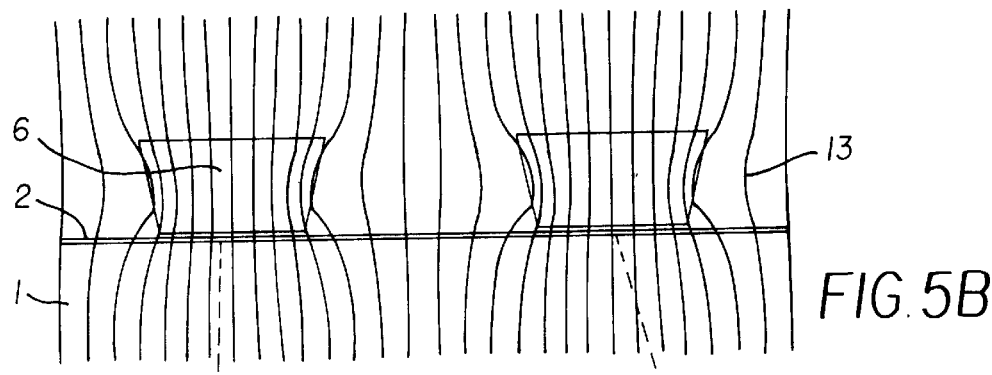
Figure 5C:
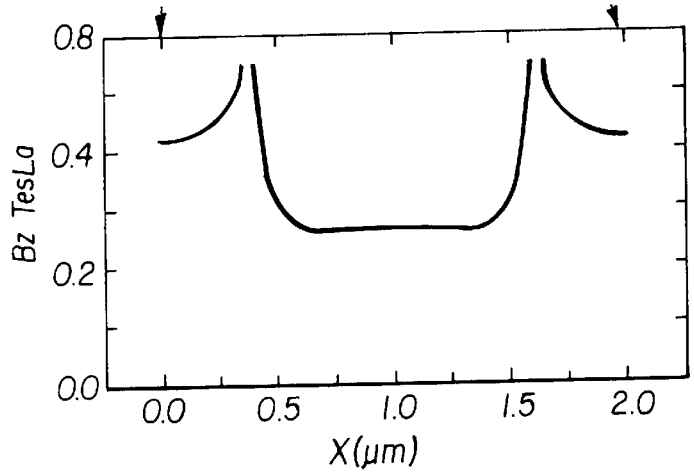

As previously described, and as shown in FIGS. 5(B) and 5(C) a perpendicular magnetic field applied to a soft magnetic material 6 is focused to the soft magnetic material 6 in the place where the soft magnetic material 6 exists, and the field becomes a leakage flux in the place where the soft magnetic material 6 does not exist. Thus, the magnetic field intensity impressed to the perpendicular magnetic recording medium 1 has periodically strong and weak values corresponding to existence and non-existence of the soft magnetic material 6. However, since the direction of the impressed magnetic field is not different between the places with and without the soft magnetic material 6, magnetic transfer takes effect based on the difference of magnetic field intensity between the places with and without the soft magnetic material 6, and does not takes effect simply based on the value of intensity of the perpendicular magnetic field generated by the soft magnetic material 6. If the coercive force Hc in the perpendicular direction of the perpendicular magnetic recording medium 1 is smaller than the magnetic field intensity in the place without soft magnetic material 6, the direction of magnetization of initialization is reversed in both places with and without the soft magnetic material 6, and signal transfer does not take effect. Therefore, the coercive force Hc in the perpendicular direction of the perpendicular magnetic recording medium 1, specifically in the magnetic recording layer 44, is restricted to a value that is smaller than the impressed magnetic field intensity in the place with the soft magnetic material 6 and larger than the impressed magnetic field intensity in the place without the soft magnetic material 6. In other words, even when a magnetic field of large magnetic field intensity is simply applied, if a large difference in magnetic field intensity is not produced between the places with and without the soft magnetic material 6, magnetic transfer of signals is not effectively accomplished.

In contrast, as shown in FIGS. 8(B) and 8(C) when a longitudinal magnetic field is applied to the soft magnetic material 6, the directions of the perpendicular component of generated magnetic field are opposite at the right edge and the left edge of the soft magnetic material 6. When the perpendicular component of the magnetic field generated by application of the longitudinal field exceeds the coercive force of the perpendicular magnetic recording medium 1, then the initialized magnetization can be reversed. That is, signals corresponding to the soft magnetic material 6 can be transferred. Magnetic transfer here is performed simply based on the intensity of the perpendicular component of the generated magnetic field, and not based on the difference in the magnetic field intensity between the places with and without the soft magnetic material 6. This makes the previously described restriction unnecessary that is implied to the magnetic recording layer 44 of the perpendicular magnetic recording medium 1 when the magnetic transfer is conducted by applying magnetic field in perpendicular direction. Thus, the range of material selection for the magnetic recording layer 44 is extended.

The above description is a basis to explain the experimental result that larger transfer signals are more easily obtained by transfer using a longitudinal magnetic field in comparison with transfer using a perpendicular magnetic field.

EXAMPLE 1

A perpendicular magnetic recording medium 1 was prepared, the medium being composed of a NiP-plated aluminum substrate 41 and the layers laminated on the substrate including a soft magnetic layer 42 of NiFe alloy having thickness of 30 nm, an under-layer 43 of Ti alloy having thickness of 10 nm, a magnetic recording layer 44 of CoCr alloy having thickness of 30 nm, a protective layer 45 of carbon having thickness of 10 nm, and a liquid lubricant layer 46 of perfluoropolyether lubricant having thickness of 1 nm. A master disk 2 is produced by arranging soft magnetic material 500 nm thick with a pattern corresponding to the desired preformat information on a surface of a silicon master disk non-magnetic substrate 32 having thickness of 500 μm. The pattern of soft magnetic material 6 is provided in the linear region 31 extending in radial direction as shown in FIG. 10.

At first, initialization of the magnetic recording medium 1 was done by applying a uniform upward magnetic field of intensity of 0.5 T to the magnetic recording medium 1 in the direction perpendicular to the medium surface using two opposite single magnetic pole heads 48 and 48, to orient the magnetization of the magnetic recording layer of the magnetic recording medium 1 uniformly upward.

Then, a master disk 2 was made closely contact with a surface of the initialized perpendicular magnetic recording medium 1 such that the surface on which soft magnetic material 6 is arranged opposed to the medium surface 1. A laminate of the perpendicular magnetic recording medium 1 and the master disk 2 was placed between two opposing ring heads 48 and 48. As shown in FIG. 9(A), each of the ring heads 48 and 48 had a gap "g" at the tip, the width of the gap being 5 mm. Each of the ring heads 48 and 48 is disposed with its gap parallel to the radial direction of the perpendicular magnetic recording medium 1, at a distance of 1.5 mm from the contact surface between the perpendicular magnetic recording medium 1 and the master disk, in a symmetric arrangement with respect to the contact surface. The magnetic field intensity generated by the ring heads was 0.5 T. Magnetic transfer was conducted keeping the distance and the relative position between the ring heads 48 and 48 and the contact surface of the laminate and moving the ring head 48 along the longitudinal magnetic field generated by the ring head 48, that is, circumferential direction of the perpendicular magnetic recording medium 1 covering whole surface of the perpendicular magnetic recording medium 1.

Preformat information was transferred to specified positions on the perpendicular magnetic recording medium 1.

EXAMPLE 2

A perpendicular magnetic recording medium 1 was prepared being provided with a soft magnetic backing layer 42, an under-layer 43, a magnetic recording layer 44, a protective layer 45, and a liquid lubricant layer 46 in this order on each of the both surfaces of the non-magnetic substrate 41 that was the same as that used in Example 1. Material and thickness of each layer was the same as in Example 1. Two master disks 2 and 2 that are the same as that used in Example 1 were prepared.

Initialization step was conducted in the same manner as in Example 1. The two ring heads 48 and 48 used in Example 1 were utilized in a magnetic transfer step. The ring heads 48 and 48 were positioned at 1.5 mm from a center plane of the perpendicular magnetic recording medium 1. Except for the position of the ring heads 48 and 48, magnetic transfer was conducted in the same manner as in Example 1.

Preformat information was transferred to specified positions on both surfaces of the perpendicular magnetic recording medium 1.

EXAMPLE 3

Magnetic transfer was conducted in the same manner as in Example 1 except that an uninitialized perpendicular magnetic recording medium 1 as obtained from a medium manufacturing process was utilized and that an initialization step was not conducted. Preformat information was transferred to specified positions on the surface of the obtained perpendicular magnetic recording medium 1.

EXAMPLE 4

Magnetic transfer was conducted in the same manner as in Example 1 except that only one ring head 48 in the master disk 2 side of Example 1 was used and that the ring head was positioned such that the gap "g" of the ring head 48 was at a distance of 1 mm from the contact surface between the perpendicular magnetic recording medium 1 and the master disk 2. Preformat information was transferred to specified positions on the surface of the obtained perpendicular magnetic recording medium 1.

Preformat information is allowed to be easily recorded on a perpendicular magnetic recording medium 1 by means of magnetic transfer using a master disk 2 carrying the preformat information according to a method of the present invention. Magnetic transfer in the method of the invention is performed by applying a longitudinal magnetic field in place of a conventional perpendicular magnetic field. Such a method does not need thick soft magnetic material 6 corresponding to the preformat information in the master disk 2. Consequently, fine pattern of the soft magnetic material 6, or a pattern with high density is made possible corresponding to the high-density preformat information.

What is claimed is:

1. A method of magnetic transfer for a perpendicular magnetic recording medium comprising the steps of:

initializing said magnetic recording medium by applying a magnetic field to said magnetic recording medium in a direction perpendicular to a surface of said magnetic recording medium so that a direction of magnetization of the surface of said magnetic recording medium is aligned in one direction, perpendicular to said magnetic recording medium; and magnetically transferring preformat information to a magnetic recording layer of said magnetic recording medium by applying an external magnetic field in a direction parallel to the surface of said magnetic recording medium to said magnetic recording medium and a master disk positioned in close contact with or in proximity to one surface of said magnetic recording medium;

wherein said master disk has a non-magnetic substrate and a plurality of isolated linear regions composed of soft magnetic material on a surface of or in a surface portion of said non-magnetic substrate;

said soft magnetic material having a pattern corresponding to said preformat information and being disclosed in the linear regions.

2. A method of magnetic transfer for a perpendicular magnetic recording medium according to claim 1, wherein in the initialization step the external magnetic field is applied to said magnetic recording medium in perpendicular direction of said medium using a single magnetic pole head; and wherein in the magnetic transfer step the magnetic field is applied in the parallel direction to said magnetic recording medium and said master disk using one or more ring heads each having a gap.

3. A method of magnetic transfer for a perpendicular magnetic recording medium according to claim 2, wherein said magnetic recording medium has an axis of easy magnetization in a direction perpendicular to the surface of said magnetic recording medium.

4. A method of magnetic transfer for a perpendicular magnetic recording medium according to claim 2, wherein a direction of recorded magnetization in said magnetic recording medium is perpendicular to the surface of said magnetic recording medium.

5. A method of magnetic transfer for a perpendicular magnetic recording medium according to claim 2, wherein in said magnetic transfer step, two ring beads opposed to each other and each having a gap are used apply the magnetic field in the parallell direction; and wherein said magnetic recording medium and said master disk are centered between said gaps of said two ring heads.

6. A method of magnetic transfer for a perpendicular magnetic recording medium according to claim 5, wherein said magnetic recording medium has an axis of easy magnetization in a direction perpendicular to the surface of said magnetic recording medium.

7. A method of magnetic transfer for a perpendicular magnetic recording medium according to claim 5, wherein a direction of recorded magnetization in said magnetic recording medium is perpendicular to the surface of said magnetic recording medium.

8. A method of magnetic transfer for a perpendicular magnetic recording medium according to claim 1, wherein said magnetic recording medium has an axis of easy magnetization in a direction perpendicular to the surface of said magnetic recording medium.

9. A method of magnetic transfer for a perpendicular magnetic recording medium according to claim 1, wherein a direction of recorded magnetization in said magnetic recording medium is perpendicular to the surface of said magnetic recording medium.

10. A method of magnetic transfer for a perpendicular magnetic recording medium comprising the steps of:

providing said magnetic recording medium in uninitialized form; and magnetically transferring preformat information to a magnetic recording layer of said magnetic recording medium applying an external magnetic field in a direction parallel to the surface of said magnetic recording medium to said magnetic recording medium and a master disk positioned in close contact with or in proximity to one surface of said magnetic recording medium;

wherein said master disk has a non-magnetic substrate and a plurality of isolated linear regions composed of soft magnetic material on a surface of or in a surface portion of said non-magnetic substrate;

said soft magnetic material having a pattern corresponding to said preformat information and being disposed in the linear regions.

11. A method of magnetic transfer for a perpendicular magnetic recording medium according to claim 10, wherein said magnetic recording medium has an axis of easy magnetization in a direction perpendicular to the surface of said magnetic recording medium.

12. A method of magnetic transfer for a perpendicular magnetic recording medium according to claim 10, wherein a direction of recorded magnetization in said magnetic recording medium is perpendicular to the surface of said magnetic recording medium.

13. A method of magnetic transfer for a perpendicular magnetic recording medium according to claim 10, wherein in the magnetic transfer step, the external magnetic field is applied in the parallel direction to said magnetic recording medium and said master disk using one or more ring heads having a gap.

14. A method of magnetic transfer for a perpendicular magnetic recording medium according to claim 13, wherein in said magnetic transfer step, two ring heads opposed to each other and each having a gap are used to apply the magnetic field in the parallel direction; and wherein said magnetic recording medium and said master disk are centered between said gaps of said two ring heads.

15. A method of magnetic transfer for a perpendicular magnetic recording medium according to claim 13, wherein said magnetic recording medium has an axis of easy magnetization in a direction perpendicular to the surface of said magnetic recording medium.

16. A method of magnetic transfer for a perpendicular magnetic recording medium according to claim 13, wherein a direction of recorded magnetization in said magnetic recording medium is perpendicular to the surface of said magnetic recording medium.

17. A method of magnetic transfer for a perpendicular magnetic recording medium, comprising the steps of:

providing the perpendicular magnetic recording medium in uninitialized form;

providing a master disk positioned in close contact with or in proximity to one surface of said magnetic recording medium, the master disk having a non-magnetic substrate and a soft magnetic pattern corresponding to preformat information to be transferred to the magnetic recording medium; and magnetically transferring the preformat information to a magnetic recording layer of said magnetic recording medium by magnetizing said magnetic recording layer in a direction perpendicular to the surface of magnetic recording medium with leakage flux from the soft magnetic pattern by applying an external magnetic field in a direction parallel to the surface of the magnetic recording layer to the magnetic recording medium and the master disk.

* * * * *